(12) United States Patent  (10) Patent No.: US 7,532,965 B2
Robillard et al.  (45) Date of Patent: May 12, 2009

(54) SYSTEM AND METHOD FOR PROVIDING USER INTERFACE FUNCTIONALITY BASED ON LOCATION

(75) Inventors: James P. Robillard, Holland, MI (US); Michael J. Sims, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 434 days.

(21) Appl. No.: 11/338,430

(22) Filed: Jan. 24, 2006

(65) Prior Publication Data

US 2006/0206242 A1    Sep. 14, 2006

Related U.S. Application Data

(60) Provisional application No. 60/646,806, filed on Jan. 25, 2005.

(51) Int. Cl.
*G06F 19/00* (2006.01)
*G01C 21/00* (2006.01)

(52) U.S. Cl. .......................................... 701/36; 701/207

(58) Field of Classification Search ....................... None
See application file for complete search history.

(56) References Cited

U.S. PATENT DOCUMENTS

| | | | |
|---|---|---|---|
| 5,414,426 A | | 5/1995 | O'Donnell et al. |
| 5,583,844 A | | 12/1996 | Wolf et al. |
| 5,646,701 A | | 7/1997 | Duckworth et al. |
| 6,028,537 A | * | 2/2000 | Suman et al. ................ 340/988 |
| 6,091,343 A | * | 7/2000 | Dykema et al. ......... 340/825.69 |
| 6,091,765 A | | 7/2000 | Dykema et al. |
| 6,271,765 B1 | | 8/2001 | King et al. |

(Continued)

FOREIGN PATENT DOCUMENTS

CA    2 295 975    12/1999

(Continued)

OTHER PUBLICATIONS

International Search Report, based on International Application No. PCT/US2003/31977, date of mailing Feb. 5, 2004 (3 pages); and International Preliminary Examination Report, date of completion Dec. 3, 2004 (7 pages).

(Continued)

*Primary Examiner*—Michael J. Zanelli
(74) *Attorney, Agent, or Firm*—Foley & Lardner LLP (57) ABSTRACT

A system for providing user interface functionality based on a location of a vehicle including a first vehicle electronic system and a second vehicle electronic system includes a user interface having at least one configurable input device, the user interface coupled to the first vehicle electronic system and the second vehicle electronic system, a control circuit coupled to the user interface and configured to determine a functionality of the at least one configurable input device, a navigation data source coupled to the control circuit and configured to provide location data for the vehicle and a memory coupled to the control circuit and the navigation data source, the memory configured to store location data associated with the first vehicle electronic system, wherein the control circuit determines the functionality of the at least one configurable input device based on the location of the vehicle and the location associated with the first vehicle electronic system.

20 Claims, 5 Drawing Sheets

U.S. PATENT DOCUMENTS

| | | |
|---|---|---|
| 6,326,889 B1 | 12/2001 | Van Horn et al. |
| 6,563,430 B1 | 5/2003 | Kemink et al. |
| 6,615,132 B1 * | 9/2003 | Nagasaka et al. ........... 701/200 |
| 6,639,519 B2 * | 10/2003 | Drummond et al. ...... 340/815.4 |
| 2005/0242970 A1 | 11/2005 | Blaker et al. |

FOREIGN PATENT DOCUMENTS

| | | |
|---|---|---|
| EP | 1 176 392 | 1/2002 |
| GB | 2 362 681 | 11/2001 |
| JP | 2001-238274 | 8/2001 |
| JP | 2002-186055 | 6/2002 |
| JP | 2002-517643 | 6/2002 |
| WO | WO 99/63308 | 12/1999 |
| WO | WO 00/75905 | 12/2000 |

OTHER PUBLICATIONS

Notification of Reason(s) for Refusal for Japanese Patent Application No. 2004-543578, Dispatch Date Oct. 30, 2007 (2 pages).
U.S. Appl. No. 11/511,071, filed Aug. 28, 2006, Jeremy Bos.
U.S. Appl. No. 10/530,588, filed Apr. 7, 2005, David Blaker.
U.S. Appl. No. 60/416,829, filed Oct. 8, 2002, David Blaker.

* cited by examiner

SYSTEM AND METHOD FOR PROVIDING USER INTERFACE FUNCTIONALITY BASED ON LOCATION

CROSS REFERENCE TO RELATED APPLICATIONS

This application claims the benefit of U.S. Provisional Application No. 60/646,806 filed Jan. 25, 2005, hereby incorporated by reference.

BACKGROUND

The present application relates to user interface systems in a vehicle and in particular to a system and method for providing user interface functionality based on vehicle location.

Vehicles typically include a number of electronic systems that provide information to a driver or passenger and receive commands from a driver or passenger. Exemplary systems include a compass, a temperature display, a navigation and/or point of interest system, a trainable transceiver, etc. A user interface (or interfaces) may be provided in the vehicle to display information and/or receive user inputs (or commands) for such systems. Often, the controls (or input devices) for multiple systems are provided in the same interior element (or location) in the vehicle. For example, buttons (or switches, dials, etc.) for providing input commands for a radio and temperature display may be provided in the same location on an instrument panel in a dashboard of the vehicle. In another example, multiple electronic systems (e.g., a point-of-interest system and a trainable transceiver) may be incorporated into the same module mounted in the vehicle. Accordingly, the user interface for the module would typically include separate user interface devices (e.g., buttons) for each system.

It would be desirable to provide a user interface for multiple electronic systems in a vehicle that includes configurable user input devices with multiple functions. Accordingly, the number of user input devices (e.g., buttons) required for multiple electronic systems may be reduced. It would also be desirable to provide configurable user input devices where the function associated with the input device is based on the location of the vehicle.

The teachings hereinbelow extend to those embodiments which fall within the scope of the appended claims, regardless of whether they accomplish one or more of the above-mentioned needs.

SUMMARY

In accordance with one embodiment, a system for providing user interface functionality based on a location of a vehicle including a first vehicle electronic system and a second vehicle electronic system includes a user interface having at least one configurable input device, the user interface coupled to the first vehicle electronic system and the second vehicle electronic system, a control circuit coupled to the user interface and configured to determine a functionality of the at least one configurable input device, a navigation data source coupled to the control circuit and configured to provide location data for the vehicle and a memory coupled to the control circuit and the navigation data source, the memory configured to store location data associated with the first vehicle electronic system, wherein the control circuit determines the functionality of the at least one configurable input device based on the location of the vehicle and the location associated with the first vehicle electronic system.

In accordance with another embodiment, a method for providing user interface functionality based on a location of a vehicle, the vehicle including a first vehicle electronic system and a second vehicle electronic system. The method includes receiving a location from a navigation data source, determining whether the received location is associated with a location stored in a memory, and changing a functionality of at least one configurable input device based on a determination whether the received location is associated with the stored location. Changing the functionality of the at least one configurable input device includes changing from controlling a second vehicle electronic system to controlling a first vehicle electronic system.

In accordance with another embodiment, a system for providing user interface functionality based on a location of a vehicle, the vehicle including a first vehicle electronic system comprising an RF transceiver and a second vehicle electronic system. The system includes a user interface having at least one configurable input device. The user interface is coupled to the first vehicle electronic system and the second vehicle electronic system. The system further includes a control circuit coupled to the user interface and configured to determine a functionality of the at least one configurable input device and a navigation data source coupled to the control circuit and configured to provide location data for the vehicle. The system yet further includes a memory coupled to the control circuit and the navigation data source, the memory configured to store location data associated with the first vehicle electronic system. The control circuit determines the functionality of the at least one configurable input device based on the location of the vehicle and the location associated with the first vehicle electronic system.

In accordance with another embodiment, system for providing user interface functionality based on a location of a vehicle. The system comprises an RF transmitter. a user interface having at least one configurable input device, a control circuit coupled to the user interface and the RF transmitter and configured to determine a functionality of the at least one configurable input device, and a display configured to display a plurality of locations, wherein each location is associated with a functionality of the configurable input device. The control circuit is configured to receive a location selection from a user and determines the functionality of the at least one configurable input device based on the location selection.

BRIEF DESCRIPTION OF THE DRAWINGS

The invention will be more readily understood by reference to the following description taken with the accompanying drawings, in which.

DETAILED DESCRIPTION

Figure 1:
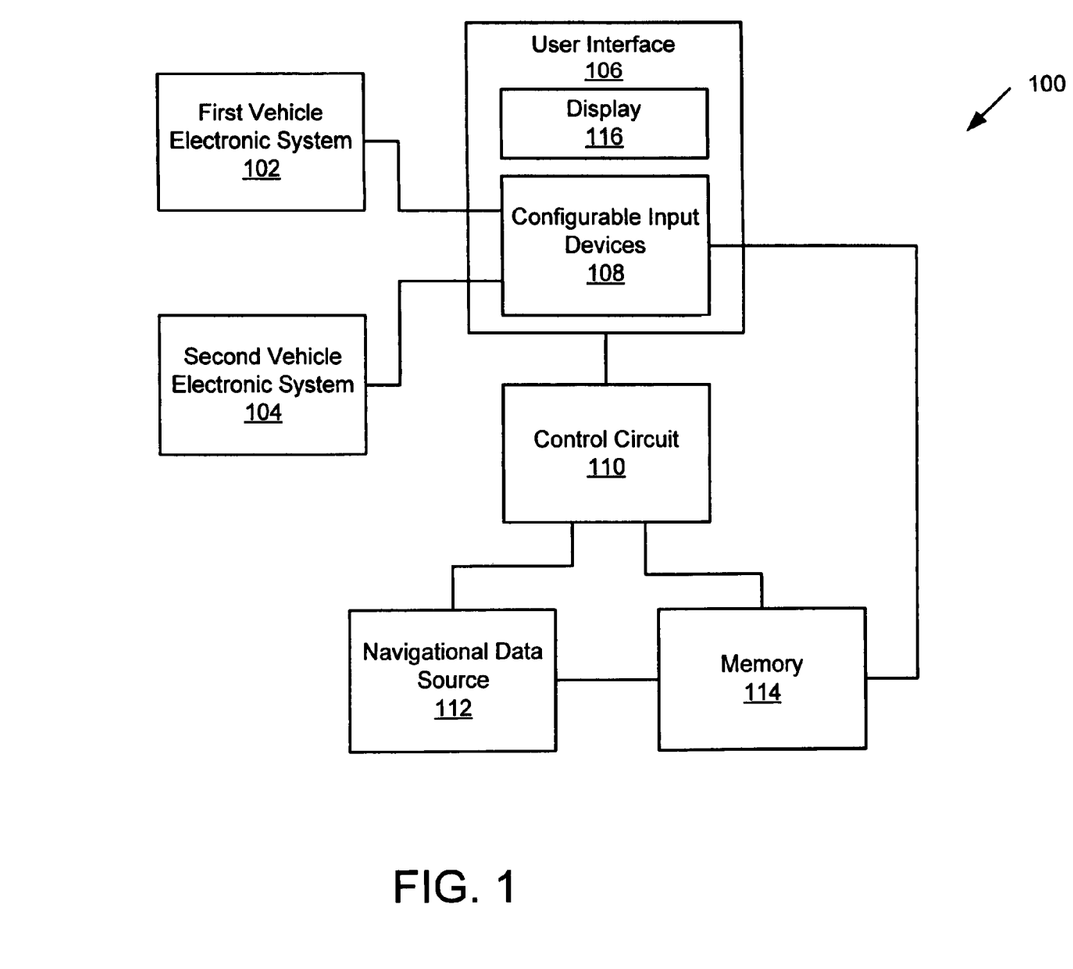
FIG. 1 is a schematic block diagram of a system for providing user interface functionality based on a location of a vehicle in accordance with an embodiment.

FIG. 1 is a schematic block diagram of a system for providing user interface functionality based on a location of a vehicle in accordance with an embodiment. The various elements of system 100 are mounted in a vehicle such as an automobile, van, sports utility vehicle, truck or the like. The various elements of system 100 may be mounted in the same or different interior vehicle elements such as an overhead console, an instrument panel, a dashboard, a visor, a rearview mirror or other appropriate location in the vehicle. System 100 includes a user interface 106 having reconfigurable input devices 108. Reconfigurable input devices 108 may be, for example, one or more buttons, switches, dials, etc. and are used to control a system or systems in the vehicle. For example, reconfigurable input devices 108 may be configured to enable the selection of a function to be preformed by a vehicle electronic system or the selection of information to be displayed. As described in further detail herein, the function of configurable input devices 108 is variable. Preferably, the functionality of configurable input devices 108 is dependent on the location or position of the vehicle.

User interface 106 is coupled to a control circuit 110 and to a first vehicle electronic system 102 and a second vehicle electronic system 104. Control circuit 110 is configured to control the various portions if system 100, to store data in memory, to operate preprogrammed functionality, etc. Control circuit 110 may include various types of control circuitry, digital and/or analog, and may include a microprocessor, microcontroller, application-specific integrated circuit (ASIC), or other circuitry configured to perform various input/output, control, analysis and other functions to be described herein.

First vehicle electronic system 102 and second vehicle electronic system 104 are coupled to configurable input devices 108 of user interface 106. First vehicle electronic system 102 and second vehicle electronic system 104 are different systems in the vehicle and may be, for example, a compass, a temperature display and control system, a navigation and/or point of interest system, a trainable transceiver, a trip computer, an engine control system, a hands-free telephone system, etc. First vehicle electronic system 102 is configured to receive input signals (e.g., command and control signals) from configurable input devices 108 upon actuation by a user. Accordingly, configurable input devices 108 may be configured to provide functionality associated with first vehicle electronic system 102. As mentioned, configurable input device 108 are multifunctional and may be reconfigured to provide functionality associated with second vehicle electronic system 104. Accordingly, second vehicle electronic system 104 is configured to receive input signals (e.g., command and control signals) from configurable input devices 108 upon actuation by a user.

Control circuit 110 is configured to switch or reconfigure the functionality of configurable input devices 108 base d upon the location or position of the vehicle. For example, when the vehicle is at a first location (e.g., within 300 feet of the location associated with first vehicle electronic system 102), configurable input device 108 are configured to provide functionality associated with first vehicle electronic system 102. When the vehicle is at a second location (e.g., the vehicle has traveled more than 300 ft from the location associated with first vehicle electronic system 102), configurable input device 108 are configured to provide functionality associated with second vehicle electronic system 104. A navigational data source 112 is coupled to control circuit 110 and a memory 114. Navigational data source 112 provides vehicle position information and may be, for example, a global positioning system (GPS), a Loran receiver, a gyro compass, a vehicle compass, a distance sensor, a dead reckoning information source and/or other sources of location and navigation data. In an embodiment where navigational data source 112 is a GPS, a GPS receiver (not shown) may be used in conjunction with an antenna (not shown) to receive global positioning satellite signals from multiple satellites and to generate location or positioning signals (e.g., latitude, longitude, altitude) representative of the location of the vehicle. Memory 114 may include volatile and non-volatile memory to, for example, store a computer program or other software to perform the functions described herein and to store navigational data (e.g., GPS positioning signals or coordinates) from navigational data source 112.

According to an alternative embodiment, control circuit 110 may receive location information based on selection of a location by a user using an input device, such as input device 108. For example, control circuit 110 may be configured to utilize display 116 to display a plurality of locations that are selectable by the user. Exemplary selections may include, but are not limited to, a home location, a vacation location, a work location, etc. Each location may be represented by a location indicia, including but not limited to, a text display, an icon, a picture, and/or some combination of the above. The user may select from the plurality of choices to provide the vehicle position information.

Figure 2:
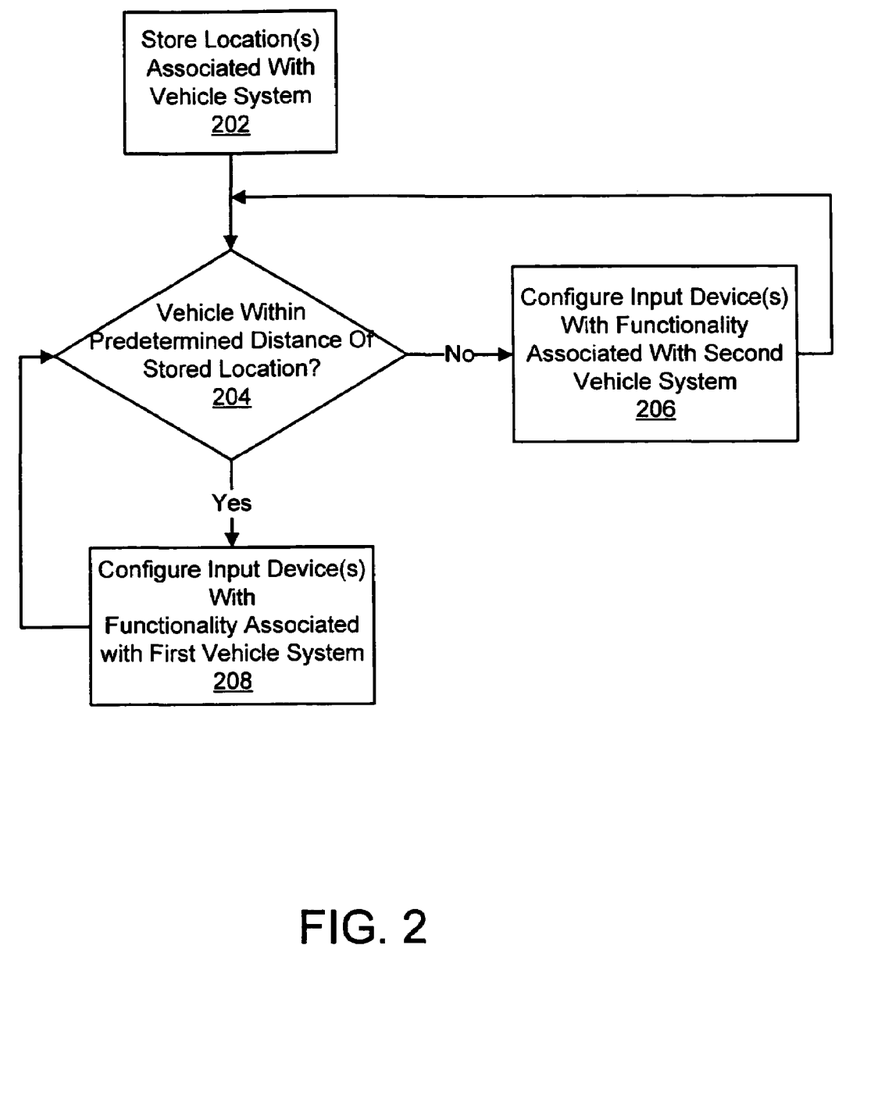
FIG. 2 illustrates a method for providing user interface functionality based on a location of a vehicle in accordance with an embodiment.

FIG. 2 illustrates a method for providing user interface functionality based on a location of a vehicle in accordance with an embodiment. Navigational data may be stored in memory 114 (shown in FIG. 1) and used to automatically change the status or functionality of configurable input devices 108 (shown in FIG. 1). At block 202, a first location or position may be stored in memory 114 that us associated with the first vehicle electronic system 102 (shown in FIG. 1). In one embodiment, multiple locations may be stored in memory that are associated with first vehicle electronic system 102 or a location or locations associated with second vehicle electronic system 104 (shown in FIG. 1) may also be stored in memory 114. In one example, the location of a home or building associated with first vehicle electronic system 102 is stored in memory 114 as well as a predetermined distance from the home (e.g., 300 feet) at which configurable input devices 108 should be configured to provide functionality associated with first vehicle electronic system 102. At block 204, if the vehicle is within the predetermined distance of the stored location associated with first vehicle electronic system 102, the configurable input devices 108 are configured with functionality associated with the first vehicle electronic system 102 at block 208. If the vehicle then moves outside of the predetermined distance (e.g., the vehicle travels more than 300 feet from the stored location associated with first vehicle electronic system 102) or is originally outside the predetermined distance at block 204, the configurable input devices 108 are configured with the functionality associated with the second vehicle electronic system 104 (shown in FIG. 1). In an alternative embodiment, location information may be stored for more than two vehicle electronic systems and configurable input devices 108 may be configured to provide functionality for more than two vehicle electronic systems.

Returning to FIG. 1, user interface 106 may also include a display 116 located near or adjacent to the configurable input devices 108. Display 116 may be a display area used to indicate the current functionality of configurable input devices 108 based on the location of the vehicle. For example, display icons may be selectively lit to indicate whether the functionality of configurable input device 108 is associated with first vehicle electronic system 102 or second vehicle electronic system 104. In an alternative embodiment, display 116 may include a variety of other display elements such as a liquid crystal display (LCD), a vacuum florescent display (VFD), a cathode ray tube (CRT) or other display elements. An area of display 116 may be associated with configurable input devices 108 and used to indicate the current functionality of configurable input devices 108. In yet another embodiment, configurable input devices 108 can me implemented as a touch screen portion of display 116.

Figure 3:
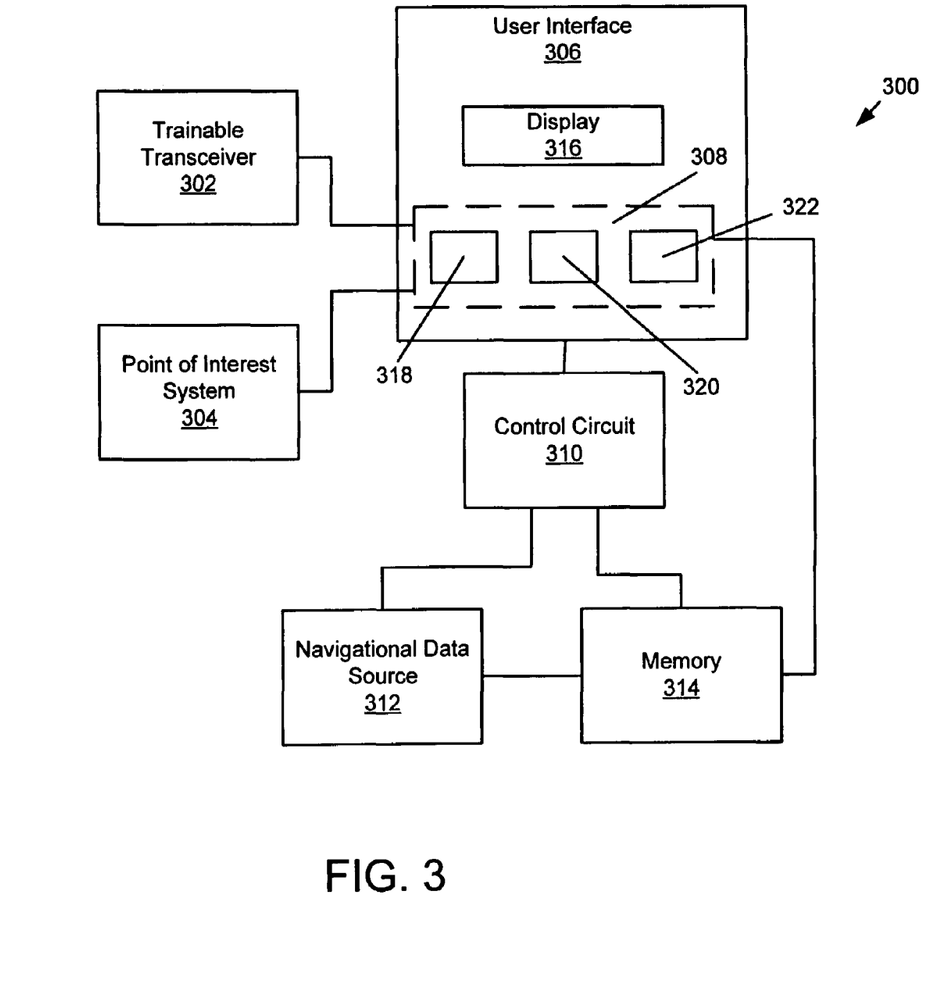
FIG. 3 is a schematic block diagram of a system for providing user interface functionality based on a location of a vehicle in accordance with an exemplary embodiment.

FIG. 3 is a schematic block diagram of a system for providing user interface functionality based on a location of a vehicle in accordance with an exemplary embodiment. In FIG. 3, a user interface 306 includes configurable input devices 308 including a first configurable input device 318, a second configurable input device 320 and a third configurable input device 322. First, second and third configurable input devices may be, for example, buttons, switches, dials, etc. For the purposes of the following discussion, configurable input devices 308 will be referred to as buttons. In the embodiment shown in FIG. 3, configurable input buttons 308 are coupled to two vehicle electronic systems, namely, an RF trainable transceiver system 302 and a point-of-interest navigation system 304. The trainable transceiver system 302 may be, for example, the HOMELINK® trainable transceiver manufactured by Johnson Controls Interiors, LLC of Holland, Mich. Trainable transceiver 302 is configured for use with various home electronic systems (not shown), such as security gates, garage door openers, lights and security systems. Trainable transceiver 302 is configured to learn and store characteristics of a control signal, such as a carrier frequency and data code of the signal, used to control a home electronic system. After training, trainable transceiver 302 may be used to generate and transmit a signal having the learned data code modulated on the learned carrier frequency signal. First configurable button 318 may be configured to initiate transmission of a first control signal to control, for example, a garage door opener. Second configurable button 320 and third configurable button 322 may be configured to initiate transmission of second and third signals to control other devices, such as a second garage door opener, home lighting, a security gate, a security system, home appliances, or any other device configured to be operated upon receipt of a transmitted signal. The devices controlled by each configurable button may be located at the same building or home or located at different buildings or homes (e.g., a garage door opener at a first home and a garage door opener at a second home). Display 316 may include an area located near or adjacent to each configurable button that may indicate the current functionality of the configurable button. For example, display 316 may include an area to indicate that first configurable button 318 is associated with a first home electronic system.

Point-of-interest navigation system 304 is configured to provide point-of-interest information to a vehicle passenger. Accordingly, first configurable button 318, second configurable button 320 and third configurable button 322 may be configured to provide a sorting function for information in a point-of-interest menu. The point-of-interest information may be provided (or displayed) on display 316 of user interface 306. Alternatively, point-of-interest information may be provided on a display located elsewhere in the vehicle. As described above, with respect to FIG. 1, display 316 may also include areas located near or adjacent to configurable buttons 308 to indicate the current functionality of configurable buttons 308. According to an exemplary embodiment, first configurable button 318 can be associated with a sort function based on the nearest available gas station. Accordingly, a first area of display 316 can display the word "GAS" to indicate the function of first configurable button 318. Similarly, a second area of display 316 can be used to display the word "FOOD" to indicate that second configurable button 320 can be depressed to sort the point-of-interest menu according to available restaurants. A third area of display 316 can be configured to display the word "LODGES" to indicate that third configurable button 322 can be depressed to sort the point-of-interest menu according to available lodging.

Figure 4:
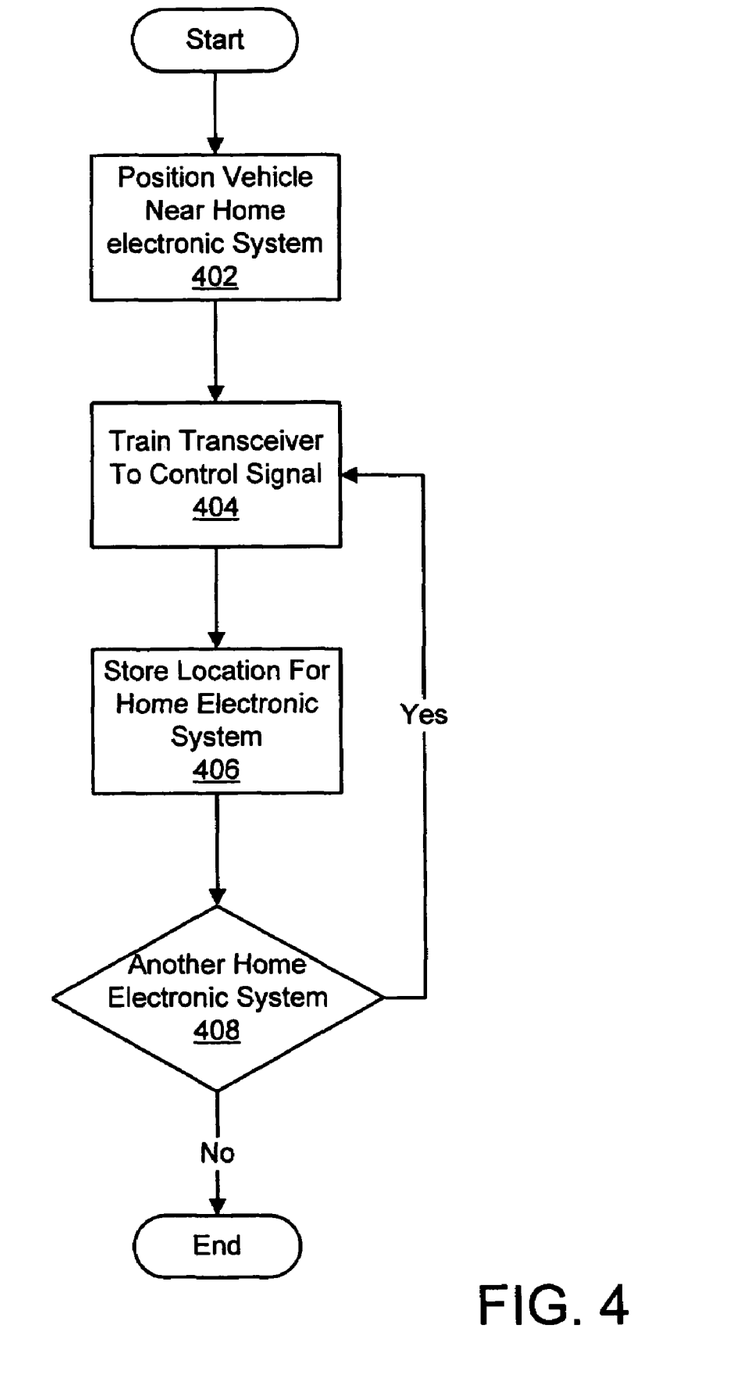
FIG. 4 illustrates a method for determining a location associated with the functionality of a vehicle electronic system in accordance with an exemplary embodiment.

Control circuit 310 is configured to automatically switch the functionality of configurable buttons 308 based on the location of the vehicle. Navigational data from a navigational data source 312 indicating a location or locations associated with trainable transceiver 302 is stored in memory 314 as well as a predetermined distance from the location where the functionality of the configurable input buttons 308 should be switched. FIG. 4 illustrates a method for determining a location associated with the functionality of a vehicle electronic system in accordance with an exemplary embodiment. As mentioned, the first vehicle electrical system is a trainable transceiver system 302. During a training mode of the trainable transceiver, a user positions the vehicle near the home having a home electronic system to be controlled by the trainable transceiver in the vehicle at block 402. During a training mode of the trainable transceiver, a user positions the vehicle near the home having a home electronic system to be controlled by the trainable transceiver in the vehicle at block 402. At block 404, the trainable transceiver is trained to the control signal for the home electronic system. A user trains the trainable transceiver by, for example, transmitting a signal from a remote controller (or original transmitter) for the home electronic system in the vicinity of the trainable transceiver. The trainable transceiver learns the carrier frequency and data code of the signal and stores this code for later retransmission. At block 406, location data (e.g., GPS coordinates, a user-defined location, etc) for the current location of the vehicle (e.g., near the home having the home electronic system) is stored in memory and associated with the trainable transceiver 302. In addition, the location may be associated with the specific channel or configurable button trained to the particular home electronic system. At block 408, if there is a second home electronic system to be controlled, the process returns to block 404 and another configurable button (e.g., second configurable button 320) is trained to the second home electronic system. A location associated with the second home electronic system is also stored. The location associated with the second home electronic system may be the same location (e.g., the same home) as for the first home electronic system or may be a different location. This process continues until the trainable transceiver is trained to each home electronic system to be controlled by the trainable transceiver.

Figure 5:
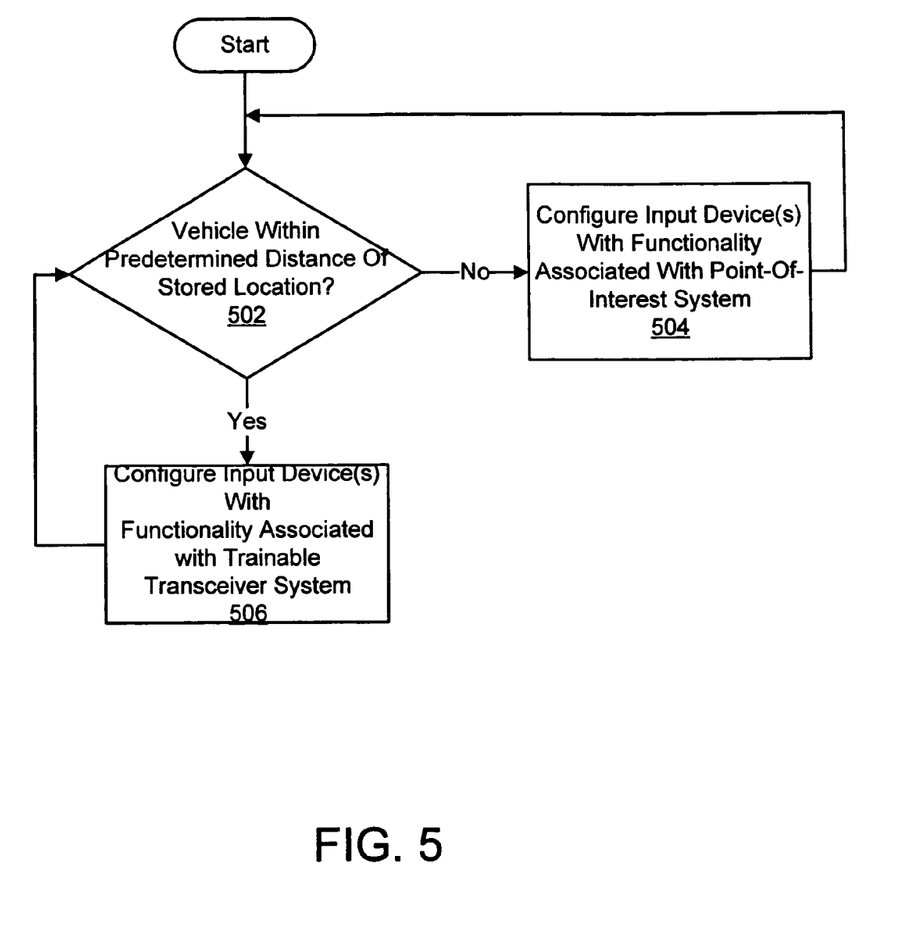
FIG. 5 illustrates a method for providing user interface functionality based on a location of a vehicle in accordance with an exemplary embodiment.

Once the trainable transceiver has been trained and the location information stored in memory, control circuit 310 (shown in FIG. 3) may be used to automatically switch the functionality of configurable buttons 308 (shown in FIG. 3) between the functionality associated with trainable transceiver 302 and the functionality associated with point-of-interest system 304. FIG. 5 illustrates a method for providing user interface functionality based on a location of a vehicle in accordance with an exemplary embodiment. At block 502, a control circuit 310 (shown in FIG. 3) determines whether the vehicle is within a predetermined distance (e.g., 300 feet) of a stored location associated with a home electronic system.

Alternatively, circuit 310 may receive a location designation from a user of system 100. If the vehicle is within the predetermined distance, configurable buttons 308 are configured with the functionality associated with trainable transceiver system 302. For example, first configurable button 318 may be used to initiate transmission of a control signal for a first home electronic system. If the vehicle is not within the predetermined distance of a stored location (e.g., the vehicle has traveled more than 300 feet from the stored location), configurable buttons 308 are configured with the functionality associated with point-of-interest system 304. For example, first configurable button 318 may be configured to provide a sort function based on the nearest available gas station, second configurable button 320 may be configured to provide a sort function based on available restaurants and third configurable button 322 may be configured to provide a sort function based on available lodging. As mentioned previously, a display (e.g., display icons) may be used to indicate the current functionality of configurable buttons 308.

It is important to note that the construction and arrangement of the systems to provide user interface functionality based on a location of a vehicle as shown in the preferred and other exemplary embodiments are illustrative only. Although only a few embodiments of the present invention have been described in detail in this disclosure, those skilled in the art who review this disclosure will readily appreciate that many modifications are possible without materially departing from the novel teachings and advantages of the subject matter recited herein. Accordingly, all such modifications are intended to be included within the scope of the present invention as described herein. The order or sequence of any processes or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

What is claimed is:

1. A system for providing user interface functionality based on a location of a vehicle, the vehicle including a first vehicle electronic system and a second vehicle electronic system, the system comprising:
   a user interface having at least one configurable input device, the user interface coupled to the first vehicle electronic system and the second vehicle electronic system;
   a control circuit coupled to the user interface and configured to determine a functionality of the at least one configurable input device;
   a navigation data source coupled to the control circuit and configured to provide location data for the vehicle; and
   a memory coupled to the control circuit and the navigation data source, the memory configured to store location data associated with the first vehicle electronic system;
   wherein the control circuit determines the functionality of the at least one configurable input device based on the location of the vehicle and the location associated with the first vehicle electronic system.

2. A system according to claim 1, wherein the first vehicle electronic system is at least one of a trainable transceiver and a system configured to transmit a radio frequency control signal for actuating a garage door opener remotely located from the vehicle.

3. A system according to claim 1, wherein the second vehicle electronic system is a point-of-interest navigation system.

4. A system according to claim 1, wherein the at least one configurable input devices is one of a button, a switch and a dial.

5. A system according to claim 1, wherein the functionality of the at least one configurable input device is associated with the first vehicle electronic system when the location of the vehicle is within a predetermined distance from the location associated with the first vehicle electronic system.

6. A system according to claim 1, wherein the functionality of the at least one configurable input device is associated with the second vehicle electronic system when the location of the vehicle is outside a predetermined distance from the location associated with the first vehicle electronic system.

7. A method for providing user interface functionality based on a location of a vehicle, the vehicle including a first vehicle electronic system and a second vehicle electronic system, the method comprising:
   receiving a vehicle location from a navigation data source;
   determining whether the received location is associated with a location stored in a memory; and
   changing a functionality of at least one configurable input device based on a determination whether the received location is associated with the stored location, wherein changing the functionality of the at least one configurable input device includes changing from controlling a first vehicle electronic system to controlling a second vehicle electronic system.

8. A method according to claim 7, wherein the second vehicle electronic system is at least one of a trainable transceiver and a system configured to transmit a radio frequency control signal for actuating a garage door opener remotely located from the vehicle.

9. A method according to claim 8, further including changing the functionality of at least one configurable input device back to controlling the first vehicle electronic system after determining that the location of the vehicle is no longer associated with the stored location.

10. A method according to claim 7, wherein the first vehicle electronic system is a point-of-interest navigation system.

11. A method according to claim 7, wherein the at least one configurable input devices is one of a button, a switch and a dial.

12. A system for providing user interface functionality based on a location of a vehicle, the vehicle including a first vehicle electronic system comprising an RF transmitter and a second vehicle electronic system, the system comprising:
   a user interface having at least one configurable input device, the user interface coupled to the first vehicle electronic system and the second vehicle electronic system;
   a control circuit coupled to the user interface and configured to determine a functionality of the at least one configurable input device;
   a navigation data source coupled to the control circuit and configured to provide location data for the vehicle; and
   a memory coupled to the control circuit and the navigation data source, the memory configured to store location data associated with the first vehicle electronic system;
   wherein the control circuit determines the functionality of the at least one configurable input device based on the location of the vehicle and the location associated with the first vehicle electronic system.

13. A system according to claim 12, wherein the first vehicle electronic system comprises at least one of a trainable transceiver and a system configured to transmit a radio frequency control signal for actuating a garage door opener remotely located from the vehicle.

14. A system according to claim 12, wherein the second vehicle electronic system is a point-of-interest navigation system.

15. A system according to claim 12, wherein the at least one configurable input devices is one of a button, a switch and a dial.

16. A system according to claim 12, wherein the functionality of the at least one configurable input device is associated with the first vehicle electronic system when the location of the vehicle is within a predetermined distance from the location associated with the first vehicle electronic system.

17. A system according to claim 12, wherein the functionality of the at least one configurable input device is associated with the second vehicle electronic system when the location of the vehicle is outside a predetermined distance from the location associated with the first vehicle electronic system.

18. A system for mounting in a vehicle having a first vehicle electronic system and a second vehicle electronic system, the system comprising:
 a user interface having at least one input device configurable to provide signals for the first vehicle electronic system and for the second vehicle electronic system; and
 a control circuit configured to receive first location data representative of a location of the vehicle from a navigation data source, the control circuit further configured to compare the first location data to second location data associated with the first vehicle electronic system and third location data associated with the second vehicle electronic system and wherein the control circuit is configured to use the comparisons to configure the at least one input device to provide the signals to the first vehicle electronic system and the second vehicle electronic system.

19. The system of claim 18, wherein the first vehicle electronic system is configured to transmit a radio frequency control signal for actuating a garage door opener remotely located from the vehicle when the at least one input device receives input from a user and when the control circuit has configured the at least one configurable input device to provide signals to the first vehicle electronic system based on the comparisons.

20. The system of claim 18, wherein the second electronic system is a point-of-interest system and wherein the user interface is a display screen; and wherein the at least one input device is a touch screen portion of the display screen.

* * * * *

UNITED STATES PATENT AND TRADEMARK OFFICE
CERTIFICATE OF CORRECTION

| | | |
|---|---|---|
| PATENT NO. | : 7,532,965 B2 | Page 1 of 1 |
| APPLICATION NO. | : 11/338430 | |
| DATED | : May 12, 2009 | |
| INVENTOR(S) | : Robillard et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this
Fourteenth Day of June, 2011

David J. Kappos
*Director of the United States Patent and Trademark Office*